(12) United States Patent
Hiyoshi

(10) Patent No.: US 6,814,991 B2
(45) Date of Patent: Nov. 9, 2004

(54) PACKAGING CONTAINER, PACKAGED FOOD AND PACKAGED FEED

(75) Inventor: Sachiko Hiyoshi, Tokyo (JP)

(73) Assignee: Kabushiki Kaisha Zac, Tokyo (JP)

( * ) Notice: Subject to any disclaimer, the term of this patent is extended or adjusted under 35 U.S.C. 154(b) by 300 days.

(21) Appl. No.: 09/951,747

(22) Filed: Sep. 14, 2001

(65) Prior Publication Data

US 2002/0054938 A1 May 9, 2002

(30) Foreign Application Priority Data

Sep. 19, 2000 (JP) .................................... P2000-283674

(51) Int. Cl.$^7$ .............................................. B65D 85/00
(52) U.S. Cl. ...................... 426/113; 426/118; 426/623; 426/630; 426/636; 426/640; 383/211; 383/45; 383/103
(58) Field of Search ................................ 426/113, 118, 426/623, 629, 630, 635, 636, 640, 395; 383/210, 211, 45, 100, 103

(56) References Cited

U.S. PATENT DOCUMENTS

| | | | | |
|---|---|---|---|---|
| 3,432,087 A | * | 3/1969 | Costello | 383/103 |
| 3,468,471 A | * | 9/1969 | Linder | 206/439 |
| 4,141,487 A | | 2/1979 | Faust et al. | 229/43 |
| 4,206,870 A | * | 6/1980 | DeVries | 383/103 |
| 4,449,242 A | * | 5/1984 | Sliney, Jr. | 383/103 |
| 4,640,838 A | | 2/1987 | Isakson et al. | 426/107 |
| 4,873,101 A | | 10/1989 | Larson et al. | 426/113 |
| 5,326,176 A | * | 7/1994 | Domke | 383/103 |
| 5,587,192 A | | 12/1996 | Beizermann | 426/118 |
| 5,989,608 A | | 11/1999 | Mizuno | 426/113 |
| 6,068,898 A | * | 5/2000 | Oyama | 428/35.2 |
| 6,423,356 B2 | * | 7/2002 | Richison et al. | 426/118 |

FOREIGN PATENT DOCUMENTS

| | | | | |
|---|---|---|---|---|
| JP | 60009453 A | * | 1/1985 | |
| JP | 61166366 A | * | 7/1986 | |
| JP | 62-69466 | | 5/1987 | |
| JP | 630309529 A | * | 12/1987 | |
| JP | 63-156978 | | 10/1988 | |
| JP | 08183570 A | * | 7/1996 | |
| JP | 10077048 A | * | 3/1998 | |
| JP | 11155522 A | * | 6/1999 | |

* cited by examiner

*Primary Examiner*—Drew Becker
(74) *Attorney, Agent, or Firm*—Armstrong, Kratz, Quintos, Hanson & Brooks, LLP

(57) ABSTRACT

Packaging container, packaged food and packaged feed, with the packaging container being produced by: preparing a hole-sealing sheet by providing, on a back surface of a base material whose bending strength (S) represented by the following formula (A) is no less than 0.20 m$^3$/N, a pressure sensitive adhesive layer whose vertical peeling strength at 40° C., with respect to a surface of the gas-impermeable container, is in the range of 0.3–2 N/cm; and sealing a vent hole in the gas-impermeable container by the hole-sealing sheet. Packaged food and feed are obtained by enclosing food and feed in the packaging container.

$$S = L/W (m^3/N) \quad (A)$$

wherein L: Critical length measured by a Clark degree testing machine (m)
W: Weight per 1 m$^2$ of the sheet base material (N/m$^2$).

10 Claims, 1 Drawing Sheet

PACKAGING CONTAINER, PACKAGED FOOD AND PACKAGED FEED

BACKGROUND OF THE INVENTION

1. Field of the Invention

The present invention relates to a packaging container for airtightly enclosing food, feed and the like and storing such food or the like without causing any deterioration of quality to the food or the like. The present invention also relates to a packaged food or the like in which food or the like is enclosed in the aforementioned packaging container and can be stored for a long period without experiencing any deterioration of quality thereof.

2. Prior Art

Techniques for enclosing food in an airtight container such as a can, a bottle or the like in order to store the food for a long period has been conventionally known. Among such preserved food, packaged food in which food is airtightly enclosed in a plastic container or the like has been increasingly utilized for various cases, because of the relatively light weight and low packaging cost thereof. In such packaged food, in general, as an attempt to prevent deterioration of quality during storage, food is enclosed under vacuum or nitrogen substitution or a deoxidizer is enclosed together with the food so that oxidization is slowed, or alternatively, the packaged food is stored in a freezer so that the rate of deterioration is slowed.

However, in the case of coffee beans which have just been roasted, for example, the beans release carbon dioxide gas as time elapses. The beans cannot be stored in an unsealed container, however, because then the aromatic components thereof will be dispersed outside and the flavor will be marred. Therefore, conventionally, such freshly-roasted coffee beans cannot but be stored in an airtight pressure resistant container and any other adequate preservation means has not been available. In addition, in the case of pickles like Korean pickles, sterilization at a high temperature cannot be carried out because such a high temperature may deteriorate the flavor of the pickles. Conventional airtight containers for packaging food having a simple structure is not likely to work, either, because there is a possibility that the sealed container with pickles enclosed therein explodes due to the increase in the pressure inside the container (such increase in the internal pressure is caused by the fermentation during storage). Accordingly, in order to preserve food or feed which may increase the pressure inside the container during storage, such as coffee beans, fermented food or silage feed, in a manner in which the flavor or the quality thereof is not damaged, it is necessary to employ a container equipped with a safe valve which valve operates only when the pressure inside the container exceeds the pressure outside the container by a predetermined value.

However, the conventional safe valve which can be used for the aforementioned purpose is essentially a precision device, which is quite expensive, and is not suitable for use in a container for storing a relatively small portion of processed food or feed and the like. On the other hand, conventional techniques for preventing explosion of a container when packaged food is heated by a microwave oven have been proposed (e.g., Japanese Utility Model 62-69466, Japanese Utility Model 63-156978). In these conventional techniques, a vent hole formed at a portion of the packaging container is sealed by a sealing piece attached to the vent hole, in a manner in which the sealing piece is peeled off due to the pressure of steam generated by heating, thereby preventing the packaging container from exploding. However, in these techniques, leakage of the content of the package and/or entry of air outside the package into the package cannot be suppressed once the vent hole is opened, and storage cannot be adequately continued thereafter. Therefore, these techniques cannot be a solution of the aforementioned problems.

SUMMARY OF THE INVENTION

A first object of the present invention is to provide an economical packaging container which, when fermented food or the like and silage feed as described above are enclosed therein for storage, is reliably prevented from exploding, although the pressure inside the container is increased, thereby eliminating the possibility of the content of the container bursting outside of the container or the quality of the content being deteriorated.

In addition, a second object of the present invention is to provide an economical packaged food and packaged feed, in which the food or feed can be preserved for a long period without experiencing deterioration of quality, although the conditions in the environment are significantly changed.

The packaging container of the present invention, which can achieve the aforementioned objects, is a gas-impermeable container sealed by an adhesive hole-sealing sheet, characterized in that the hole-sealing sheet is formed by providing, on a back surface of a gas-impermeable sheet base material whose bending strength (S) represented by the following formula (A) is no less than $0.20 \ m^3/N$, a pressure sensitive adhesive layer whose vertical peeling strength at 40° C., with respect to a surface of the container in which at least a vent hole is formed, is in the range of 0.3–2 N/cm.

In addition, the container of the present invention is preferably formed by plastic or metallized plastic. Further, the container of the present invention preferably has a bag-like shape.

$$S = L/W (m^3/N) \tag{A}$$

wherein

L: Critical length measured by a Clark degree testing machine (m)

W: Weight per 1 $m^2$ of the sheet base material $(N/m^2)$

Further, the packaged food or the packaged feed of the present invention, which can achieve the aforementioned second object, is characterized in that desired food or feed is enclosed in the container having the structure as described above.

DETAILED DESCRIPTION OF THE PREFERRED EMBODIMENT

Figure 1:
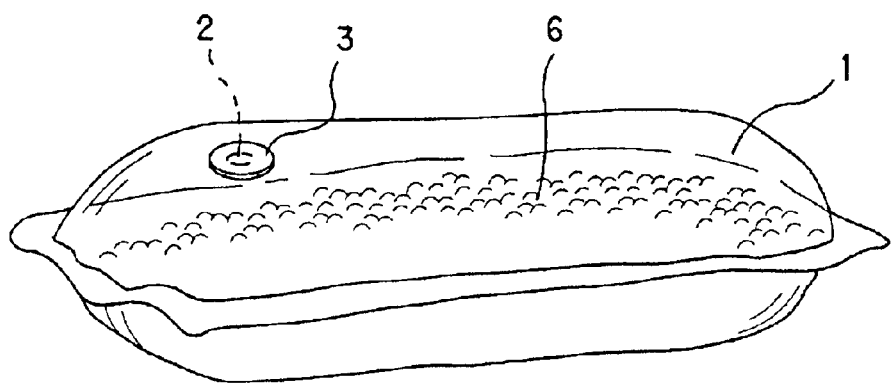
FIG. 1 is a perspective view which shows the outlook of an example of a packaging container of the present invention.

The packaging container of the present invention is a gas-impermeable container which has a vent hole and can be airtightly sealed by sealing the vent hole by an adhesive hole-sealing sheet. The whole portion or at least a portion of the package container is preferably made of plastic or metallized plastic. However, the packaging container of the present invention may be made of metal or a composite material of paper or metal and plastic. Examples of the plastic material which can be used for forming such a container include: a single material or a composite material containing, as main components, polypropylene, polyester, polysulfone, polyamide (nylon), polycarbonate and the like; and a laminated layer-composite material in which the aforementioned single material or composite material is combined with plastic materials such as polyethylene, ethylene vinyl acetate resin (EVA), polyacrylate, polyvinylidene chloride and polyvinyl alcohol or metallic material such as aluminum foil or aluminum-deposited film or the like.

The packaging container of the present invention may be formed as desired as long as the container is, in the basic characteristic thereof, gas-impermeable, excellent in airtight, watertight, oil resistance and heat resistance properties, has adequate mechanical strength and can be airtightly sealed with the content accommodated therein. However, it is preferable that a portion of the packaging container is transparent so that the content therein can be seen, in terms of making the check of the preservation state of the content easy. In addition, the packaging container of the present invention may have any suitable shape including box-like, cylinder-like, bag-like shape, without any particular limitation. However, the packaging container having bag-like shape may be the most convenient in use.

The pressure inside the container is increased as the temperature in the container rises up and gases are generated inside the container. The packaging container of the present invention is provided with at least a vent hole for leaking the pressure inside the container, which has increased in such a manner, outside the container. The position at which the vent hole(s) is formed in the container may be selected as desired as long as the selected position does not disturb leakage of gases nor cause any leakage of other contents. The vent hole is sealed by the hole-sealing sheet having a pressure sensitive adhesive layer. In order to ensure reliable sealing of the vent hole by the hole-sealing sheet, it is preferable that the portion of the container in which the vent hole is formed has a smooth surface.

In addition, the vent hole may have any suitable shape such as circular, ellipsoidal, oval or polygonal shape. The size of the diameter of the vent hole is preferably 5 mm or so, but is not particularly limited.

The hole-sealing sheet for sealing the aforementioned vent hole is a composite body formed by a gas-impermeable sheet base material whose bending strength (S) represented by the following formula (A) is no less than 0.20 m$^3$/N, and a pressure sensitive adhesive layer which is provided on the back surface of the sheet base material and whose vertical peeling strength at 40° C., with respect to a surface of the container in which at least one vent hole is formed, is in the range of 0.3–2 N/cm.

$$S = L/W (m^3/N) \tag{A}$$

Note that L is a value, which is expressed by (m) unit, of the critical length measured by using a Clark degree testing machine according to the prescription of JIS P 8143. W is the weight per 1 m$^2$ of the sheet base material, which is calculated from the weight of a sample having a known area. That is, W is a gravity value (N/m$^2$), which is a correction coefficient for eliminating the influence of the acceleration by the gravity on the measured sample.

As the sheet base material used here, the base material which is gas-impermeable and has excellent airtight, watertight, oil resistance and heat resistance properties is preferably employed, as is the case of the plastic sheet which forms the packaging container. Examples of the base material of the sheet base material include a sheet of polyester, polyvinyl chloride or the like and a synthetic paper. Chemical paper formed by plastic materials may also be used for the sheet base material.

The sheet base material must have bending strength (S) of no less than 0.20 m$^3$/N. When the bending strength thereof is less than 0.20 m$^3$/N, the amount of gases which leak out of the vent hole can hardly be controlled and gases may freely escape from the container, which is not desirable.

On the other hand, as the component of the pressure sensitive adhesive layer provided on the back surface of the hole-sealing sheet, a pressure sensitive adhesive, which is produced by blending natural rubber, synthetic rubber (styrene butadiene-based rubber and acryl-based rubber, in particular) with a rosin-based or petroleum resin-based stickiness-providing material, may be used. Among such examples, the acryl rubber-based pressure sensitive adhesive is especially preferable in use, because the acryl rubber-based pressure sensitive adhesive is relatively resistant to deterioration of performance thereof when used for a long period.

Further, it should be noted that, as the pressure sensitive adhesive used here, a pressure sensitive adhesive whose vertical peeling strength at 40° C., with respect to a surface of the container in which the vent hole is formed, is in the range of 0.3–2 N/cm is to be selected in an appropriate manner. When the vertical peeling strength of the pressure sensitive adhesive is less than 0.3 N/cm, the pressure inside the packaging container drops in a relatively short period and allows the air outside the container to come into the package, which should be avoided. On the other hand, when the vertical peeling strength of the pressure sensitive adhesive is larger than 2 N/cm, the pressure resistance strength of the container has to be unnecessarily increased in order to prevent the occurrence of explosion, which is not recommendable, either.

The term "vertical peeling strength" used in the present specification indicates the adhesive properties with respect to the material that constitutes the surface of the packaging container in which the vent hole is formed. Accordingly, when the material used for the surface in which the vent hole of the container is formed is replaced with a different material, the pressure sensitive adhesive to be used in association with the surface material has basically to be changed to another one. Therefore, it should be noted that the numerical values of the "vertical peeling strength" used here are not such numerical values which are inherent to the adhesive itself as is obtained by measurement in accordance with the standard adhesive strength testing method and the like practiced in the industry (described in JIS Z 0237, for example).

In the packaging container of the present invention, various types of food can be enclosed for storage. Examples of such food include: food like pickles such as Korean pickles, Misozuke, Narazuke, compressingly pickled vegetables; flavorous beverage-based food such as roasted coffee beans, tea leaves, powder tea, aromatic tea; spice-based food such as pepper, Japanese horse radish, curry powder, Japanese mixed hot spices; seasoning-based food such sliced dry tuna; and others such as dry sea weed, dry fishes, tsukudani (tasted seafood/meet flakes).

The packaged food produced by enclosing food in the aforementioned packaging container of the present invention demonstrates excellent effects not only during storage but also during transport of the food, in preventing deterioration of the content, leakage of the content due to breakage of the container and contamination of surroundings resulted from the leakage of the content. Specifically, when the container is sealed in a state in which gases like air or nitrogen have been injected inside the packaging container (already having the content therein) at a pressure which is slightly higher than that of the atmospheric pressure, as the bent hole has been sealed by the hole-sealing sheet having the pressure sensitive adhesive layer thereon, leakage of gases inside the container never happens.

However, when the gas pressure inside the container is increased by the generation of gases due to the fermentation of the content, increase in volume of gases due to changes in temperature of the environment or pressure applied to the stacked cargo due to vibration, the gases in the container are gradually dispersed between the surface of the packaging container at the periphery of the vent hole and the pressure sensitive adhesive layer of the hole-sealing sheet, leak out of the container, thereby stopping the increase in the pressure inside the container. When the pressure inside the container is reduced, the leakage of the gases stops and the pressure inside the container is prevented from dropping further.

As described above, since the packaging container of the present invention has a function of suppressing changes in the pressure inside the container, the content therein can be safely preserved. By utilizing this function, the packaging container of the present invention can be employed as a packaging container for transporting freshly harvested grass or silage grass to a remote place. In this case, the feed such as rolled-up grass is wrapped by a plastic sheet, the wrapped feed is made to have a bag-shaped body by attaching the seams of the sheet, for example, and vent holes are formed in an appropriate manner so as to be each sealed by a hole-sealing sheet, thereby forming a packaging container. Other suitable methods may also be used for forming such a packaging container.

In addition, sugar cane waste obtained after the sugar making process can be enclosed, in the wet state, in the packaging container of the present invention and transported, so that the sugar can waste is used as a feed in the aforementioned manner or a material of pulp for paper making. In short, the packaging container of the present invention is not only useful as a packaging container for storage, but can also be advantageously used as a packaging container for transporting various industrial raw material.

EXAMPLES

The present invention will be described on the basis of examples thereof hereinafter.

Figure 2:
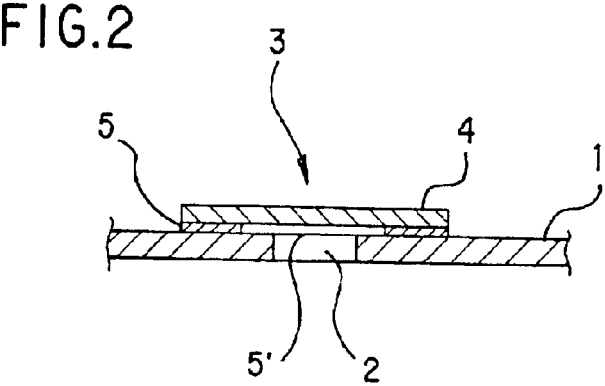
FIG. 2 is a sectional view which shows the structure of a vent hole portion of the packaging container of the present invention.

In FIGS. 1 and 2, the reference number 1 represents a soft and bag-shaped gas impermeable container main body, which is constituted of double-layered sheets of nylon 6 and EVA. A circular-shaped vent hole 2 is formed at a portion of the container main body 1. The vent hole 2 is sealed by a circular-shaped gas-impermeable hole-sealing sheet 3, which is produced by providing, on the back surface of a sheet base material 4 formed by a polyester sheet, polyvinyl chloride or the like, a pressure sensitive adhesive layer 5 which works with respect to the nylon 6 surface. A non adhesive portion 5' having ellipsoidal shape is formed at the vicinity of the center portion of the pressure sensitive adhesive layer 5.

In the packaging container described above, the content 6 such as roasted coffee beans in the pulverized state is enclosed together with gases such as air, nitrogen gas or carbon dioxide gas.

Example 1

As an example of the packaging container of the present invention, a container main body having the aforementioned structure of a bag-shaped (width 10 cm×length 20 cm) outer look (filling capacity: approximately 800 mL) was prepared. A circular-shaped hole-sealing sheet A having diameter of 10 mm was produced by: preparing a white synthetic paper, which was formed by a hard polyvinyl-based plastic foamed sheet and whose bending strength (S) was 0.27 $m^3/N$ and thickness was 83 $\mu$m, as the sheet base material a1; coating the sheet base material a1 with an acryl-based pressure sensitive adhesive a2 whose vertical peeling strength with respect to the nylon 6 surface was 1.1 N/cm such that the thickness of the pressure sensitive adhesive a2 was 25 $\mu$m; and providing a non adhesive portion having ellipsoidal shape (diameters: 5 mm×7 mm) in the vicinity of the center portion of the pressure sensitive adhesive layer. The hole-sealing sheet A was sealingly attached to the vent hole having diameter of 3 mm and formed in the aforementioned container main body. A packaging container A was thereby obtained.

On the other hand, a hole-sealing sheet B, a hole-sealing sheet C, and a hole-sealing sheet D were each produced by replacing, respectively, the sheet base material a1 of the aforementioned packaging container A with another sheet base material b1, yet another sheet base material c1, and yet another sheet base material d1 each having the bending strength ($m^3/N$) as shown in Table 1, and coating the pressure sensitive adhesive a2 so that the adhesive had the same thickness as the hole-sealing sheet A. The produced hole-sealing sheet B, C and D were each sealingly attached to the vent hole of the aforementioned bag-shaped container main body. A packaging container B, a packaging container C and a packaging container D were thereby obtained.

TABLE 1

| Properties of Sheet Base Material | | | | |
|---|---|---|---|---|
| Sheet Base Material | a | b | c | d |
| Type of Material | Foamed Synthetic Paper | Foamed Synthetic Paper | Foamed Synthetic Paper | Coated Paper |
| Thickness ($\mu$m) | 83 | 82 | 47 | 101 |
| Bending Strength ($m^3/N$) | 0.27 | 0.09 | 0.18 | 0.15 |

Next, 400 g of roasted coffee beans in the pulverized state was put into each of the packaging containers A–D, the package was degassed and then carbon dioxide gas was introduced into the package. The opening end portion of the container was weldingly sealed by using a high wave welder. In such a manner, five samples were prepared for each of the packaged food of the present invention and the comparative examples. These packaged food samples were stored at the room temperature and the pressure inside each container was monitored to observe the changes therein as time elapsed. In each sample, the pressure inside the container gradually increased for 40–50 hours from the starting of the experiments and then dropped after reaching the maximum pressure. Specifically, in the samples of the packaged food A of the present invention, the pressure inside the containers increased to approximately 1.5 atm. in 7–10 days counted from the starting of the experiment and reached a plateau stage. The pressure inside the containers then started to drop gradually, and it took about 30 days on average for the pressure inside the containers to drop to 0.2 atm. In the samples of the packaged food B, the hole-sealing sheet B came off after two days, on average, after the starting of the experiment, bringing the containers into the "opened" state. In the samples of the packaged food C, the pressure inside the containers reached the maximum pressure in 7–10 days and then the pressure started to drop rapidly, becoming substantially zero 3 days after the starting of dropping. In the samples of the packaged food D, the increase in the pressure inside the containers was relatively slow and the pressure never rose up higher than 0.1 atm.

On the other hand, the amount of generation of carbon dioxide gas was separately analyzed for 400 g of roasted coffee beans, which was the same amount as the roasted coffee beans in the pulverized state enclosed in the packaged food samples described above. As a result, the amount of generation of carbon dioxide gas was approximately 1.5 liter after 5 days, approximately 1.9 liter after 10 days and reached approximately 2.2 liter after 20 days counted from the starting of the experiment. Accordingly, it is understood that: in all of the aforementioned samples of the packaged food, the carbon dioxide gas generated by the packaged food leaked out of the container through the vent hole; and in the samples of the packaged food of the comparative examples, almost all the amount of generated carbon dioxide was escaped in a relatively short period, but this is not the case in the packaged food of the present invention.

Further, 20 days after the starting of the experiments, the aforementioned samples of the packaged food were opened and drip coffee was prepared by using the samples. The change in flavor which occurred to each sample was checked by a feeling test conducted by a panel of five examiners, with reference to a coffee sample which was preserved in a freezer in the airtightly sealed state. Any deterioration of flavor was hardly recognized in the packaged food of the present invention. In contract, in all the samples of the packaged food of the comparative examples, decrease in aromatic flavor and significant deterioration of the quality was observed.

Example 2

A hole-sealing sheet E and a hole-sealing sheet F were produced by replacing, respectively, the pressure sensitive adhesive a2 used for the hole-sealing sheet A of example 1 with another pressure sensitive adhesive b2 or yet another pressure sensitive adhesive c2 having adhesive properties as shown in Table 2, and coating the aforementioned sheet base material a1 with the pressure sensitive adhesive b2 or the pressure sensitive adhesive c2 so that the adhesive had the thickness of 25 $\mu$m. The produced hole-sealing sheet E, F were each sealingly attached to a vent hole of a bag-shaped container main body, in a manner similar to example 1. A packaging container E and a packaging container F were thereby obtained.

TABLE 2

Adhesive Properties of Pressure Sensitive Adhesive with respect to Nylon 6 Sheet

| Pressure Sensitive Adhesive | a | b | c |
|---|---|---|---|
| Vertical Peeling Strength (N/cm) | 1.1 | 3.5 | 0.2 |

Next, roasted coffee beans in the pulverized state was put into each of the packaging containers E and D and the packaging containers E and D were weldingly sealed, in a manner similar to example 1. The comparative packaged food E and D were thereby obtained. The packaged food E and D were stored at the room temperature with the packaged food A of the present embodiment and the change in the pressure inside the containers thereof was monitored. In the samples of the packaged food A of the present invention, the pressure inside the containers increased to the maximum value (approximately 1.3 atm.) in 2 days or so from the starting of the experiment and then slowly dropped. In the samples of the packaged food E, the pressure inside the container continued to increase, gradually, even 5 days after the starting of the experiment, so as to exceed 2 atm. After 10 days from the starting of the experiment, in some of the samples of the packaged food E, the containers thereof were found in the broken state. In the samples of the packaged food F, the pressure inside the containers did not rise up higher than 0.5 atm. or so and it took 10–15 days for the pressure inside the container to drop to 0.2 atm.

Example 3

A packaging container of the present invention was produced by: preparing a flexible, bag-shaped container (width: 50 cm×length: 110 cm) by using nylon 6 sheet having thickness of 0.25 mm; providing a fastener portion at the end portion of the packaging container in the longitudinal direction thereof; forming six vent holes in the vicinity of the fastener portion; and sealing the vent holes by hole-sealing sheets each formed by combining the aforementioned sheet base material a1 and the pressure sensitive adhesive a2.

On the other hand, a packaging container of a comparative example was prepared in a manner similar to example 3 except that the vent holes were not formed. Sugar cane waste obtained after the sugar making process was filled in each of the packaging containers of the present invention and the comparative example, thereby obtaining a packaged feed of the present invention and a packaged feed of the comparative example. These two types of packaged feed were stored, in the stacked manner, in a storehouse.

After one week, the state of the packaged feed was examined. The packaged feed of the present invention was fermented and the temperature thereof had risen to almost 50° C. However, the outlook of the container showed no abnormality. On the other hand, the container of the packaged feed of the comparative example had exploded and the content thereof had been scattered around.

As described above, the packaging container of the present invention is produced by: forming at least one vent holes in an airtight container; preparing a hole-sealing sheet by providing, on a back surface of a sheet base material whose bending strength (S) is no less than 0.20 m$^3$/N, a pressure sensitive adhesive layer whose vertical peeling strength at 40° C. is in the range of 0.3–2 N/cm; and sealing each vent hole by the hole-sealing sheet. In the packaged food in which food is sealingly enclosed in the packaging container of the present invention, if the pressure inside the container changes due to the generation of gases by the action of the content of the container or the increase in temperature of the environment, a portion of gases is automatically leaked out of the container so that breakage of the container is prevented. The container then returns to the airtightly sealed state so as to suppress deterioration of the quality and bursting-out of the content thereof. Accordingly, the packaging container of the present invention can be used for packaging whatever content including food, feed and the like and achieve an excellent effect of safely and economically preserving such content for a long period.

What is claimed is:
1. A packaging container which is a gas-impermeable container having at least one vent hole sealed by an adhesive hole-sealing sheet, characterized in that the hole-sealing sheet is formed by providing, on a back surface of a gas-impermeable sheet base material whose bending strength (S) represented by the following formula (A) is no less than 0.20 m³/N, a pressure sensitive adhesive layer whose vertical peeling strength at 40° C., with respect to a surface of the container in which the at least one vent hole is formed, is in the range of 0.3–2 N/cm- $$S = L/W \ (m^3/N) \tag{A}$$

wherein L: Critical length measured by a Clark degree testing machine (m)

W: Weight per 1 m² of the sheet base material (N/m²).

2. A packaging container described in claim 1, wherein the container is formed by plastic or metallized plastic.

3. A packaging container described in claim 1 or 2, wherein the container is formed in bag-shape.

4. A packaged food characterized in that a food is enclosed in the packaging container described in claim 1 or 2.

5. A packaged food described in claim 4, wherein the food is roasted coffee beans.

6. A packaged food described in claim 4, wherein the food is pickles.

7. A packaged food described in claim 4, wherein the food is fermented seasonings.

8. A packaged feed characterized in that a feed is enclosed in the packaging container described in claims 1 or 2.

9. A packaged feed described in claim 8, wherein the feed is silage feed.

10. A packaged feed described in claim 8, wherein the feed is dry grass.

* * * * *